June 19, 1951 — W. G. HOELSCHER — 2,557,822
COLUMN LUBRICATION FOR RADIAL DRILLS
Filed March 15, 1946 — 3 Sheets-Sheet 1
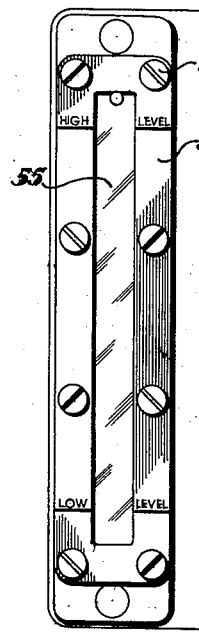
Fig. 5
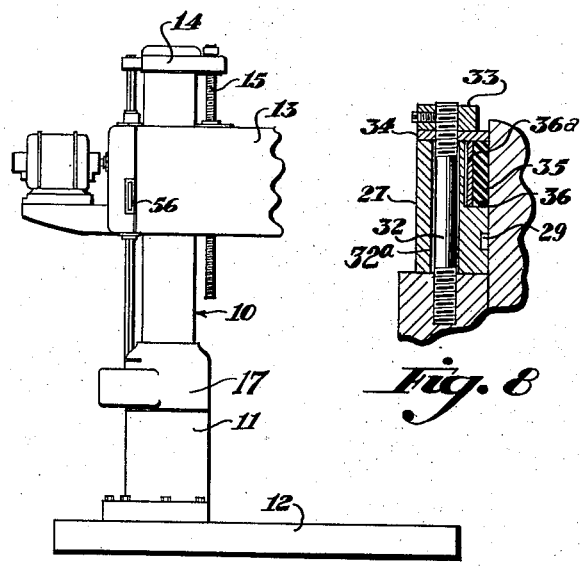
Fig. 1
Fig. 8
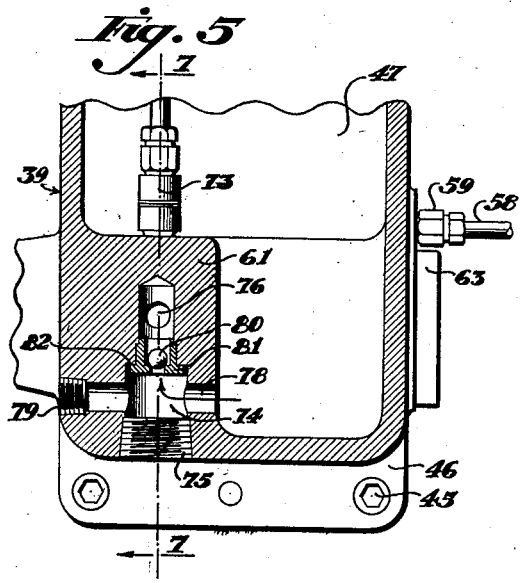
Fig. 6
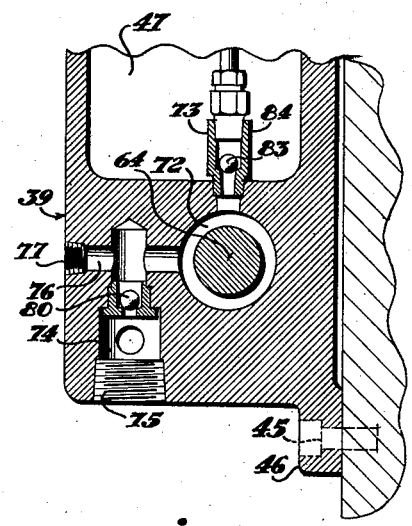
Fig. 7
INVENTOR.
William G. Hoelscher
BY
Wood, Arey, Herron & Evans
ATTORNEYS June 19, 1951 W. G. HOELSCHER 2,557,822
COLUMN LUBRICATION FOR RADIAL DRILLS
Filed March 15, 1946 3 Sheets-Sheet 3

INVENTOR.
William L. Hoelscher
BY
Wood, Arey, Herron & Evans
ATTORNEYS

Patented June 19, 1951

2,557,822

UNITED STATES PATENT OFFICE 2,557,822

COLUMN LUBRICATION FOR RADIAL DRILLS

William G. Hoelscher, Cincinnati, Ohio, assignor to The American Tool Works Company, Cincinnati, Ohio, a corporation of Ohio Application March 15, 1946, Serial No. 654,691

5 Claims. (Cl. 184—6)

This invention relates to lubricating apparatus for machine tools. It is particularly directed to apparatus of this character for use in a radial drill. More particularly, the purpose of the invention is to maintain a film of oil between the column and the arm which has a sleeve portion encircling the column adapted to be raised and lowered on the column. The arm carries the drill head and its driving and feeding mechanism. It is therefore a very heavy unit, its column embracing sleeve portion fitting the column snugly in order that the arms will not sag at its outer or drill carrying end. Power driven mechanism is provided for raising and lowering the arm upon the column in order that the drill head may be adjusted to the height desired with respect to the work.

In the past, oil has been supplied to the column at the upper and lower ends of the sleeve portion of the arm which embraces the column, the oil being applied by means of a brush or an oil can. Obviously, correct lubrication has been dependent upon the diligence of the operator and has been neglected. In the elevating and lowering movements of the arm, the leading edge has a tendency to wipe the oil from the column surface. As a result only a limited amount of lubricant is effective for lubricating the bearing between the arm and the column. The pressure between the bearing surfaces is considerable and unless lubricant is present at all times acute wear will result.

In the previously filed application of this inventor, Serial No. 508,600, filed November 1, 1943, now Patent Number 2,441,764, and also entitled "Column Lubrication for Radial Drills," an apparatus was provided for reliably and conveniently furnishing a supply of oil between the mating surfaces of the arm and column. Annular recesses were provided adjacent the opposite ends of the arm sleeve or column embracing portion. Oil was maintained in these recesses or channel ways, the oil being replenished from time to time through a pump having a lever which was arbitrarily manipulated by the operator.

It has been the object of this inventor in the present improvement to provide means which will automatically deliver the oil to the annular lubricant channels or recesses and thus to eliminate any possibility that the mating surfaces will be without oil. More particularly, it has been the purpose to provide for automatic delivery of oil when the arm is being elevated, this being a preferred arrangement in conjunction with delivery of oil only to the upper annular recess. It is evident this provides a very effective oiling system for as the arm moves upwardly the oil having been delivered to the upper recess will be spread or smeared upon the column or between the column and the arm sleeve as the upper recess slides upwardly along the column. It will be understood that the broad phase of the invention resides in the automatic delivery of lubricant when the arm is first moved.

It has been a further object of the inventor to provide an automatic delivery means which will deliver a shot or a measured quantity of lubricant at the time of movement of the elevating control lever to elevating position. The pump means provided is effective for this one-shot type of delivery and will remain inactive for delivery until the next time the arm is elevated. That is to say, when the arm elevating lever is returned to arm clamp position, the pump piston is reset for future delivery of another quantity of lubricant. If the arm control lever is moved to arm lowering position, the pump continues to remain inactive. The inventor has determined that this is the preferred arrangement since the oil will naturally flow down the column and since there is less load and therefore less pressure between the bearing surfaces as the arm is lowered.

Other objects and certain details of the invention will be more fully apparent from the detailed description of the preferred embodiment as disclosed in the following figures:

Figure 1 is a general side view of a radial drill of the type to which the present improvements are applied.

Figure 5 is a face view of the oil level indicating gauge.

Figure 6 is a sectional view taken on line 6—6 Figure 4, detailing the oil intake control mechanism at the base of the pump reservoir.

Figure 7 is a sectional view taken on line 7—7 Figure 6 further detailing the intake mechanism as well as the delivery conduit.

Figure 8 is a fragmentary sectional view taken on line 8—8 of Figure 4.

Figure 2:
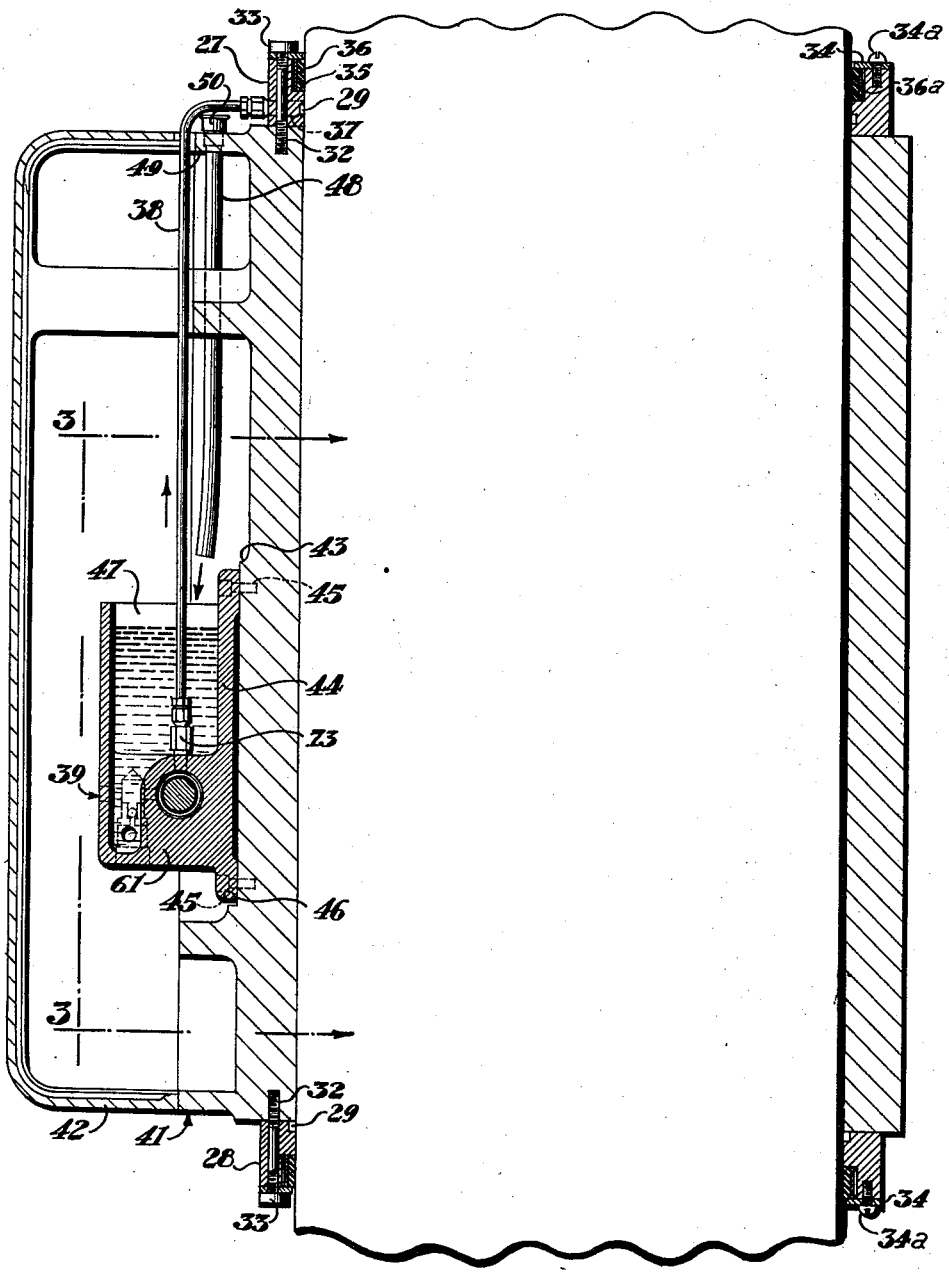
Figure 2 is a sectional view taken vertically diametrically through the column embracing or sleeve portion of the arm, and showing generally the oil supplying means.

Referring to the drawings, particularly Figure 1, the column is generally indicated at 10. The column is supported rotatively on a stump indicated at 11 which in turn is mounted on a base 12. The arm 13 is vertically adjustable upon the column and carries at its outer end (not shown) the conventional laterally adjustable tool head which is provided with the conventional rotatable and translatable spindle. The column is provided with the usual cap 14 from which the elevating screw 15 is suspended and traverses the arm adjacent the column.

Figure 4:
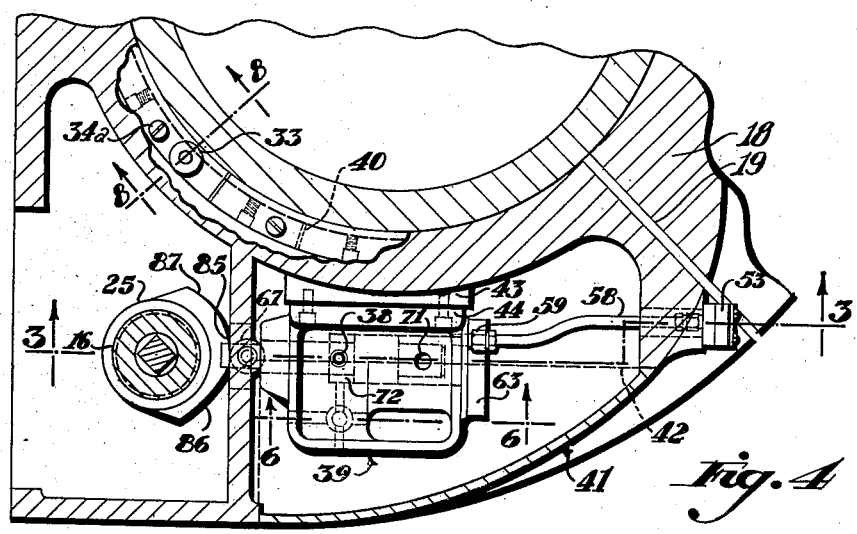
Figure 4 is a sectional view taken on line 4—4 Figure 3 further illustrating the pump and the cam arrangement for actuating the same.

The shaft generally shown at 16 journaled in the cap 14 and the lower portion 17 of the column, controls the elevating movements of the arm and operates the clamps which secure the arm to the column. As stated, the arm is provided with a sleeve portion generally indicated at 18 which embraces or encircles the column. The sleeve portion is bored to fit over the column in snug relationship thereto. This sleeve portion 18 is split longitudinally as at 19 so as to be expansible and contractable (Figure 4).

A conventional clamping apparatus is employed there being two clamping arms utilized at the upper and lower end of the sleeve respectively, the lower one being shown at 20. These arms operate clamping bolts, the head ends of the lower one of which is shown at 21, the action of the arms being to draw the cheeks of the split sleeve together, the screws or bolts operating through lugs 22. The free end of the arm 20 carries a roller 23 which is engaged by a cam 24 fixed to the tubular control shaft 16. It will be understood that the arm carries the usual nut traversed by the screw 15 so that relative rotation between the nut and screw brings about a raising and lowering movement of the arm upon the column.

Figure 3:
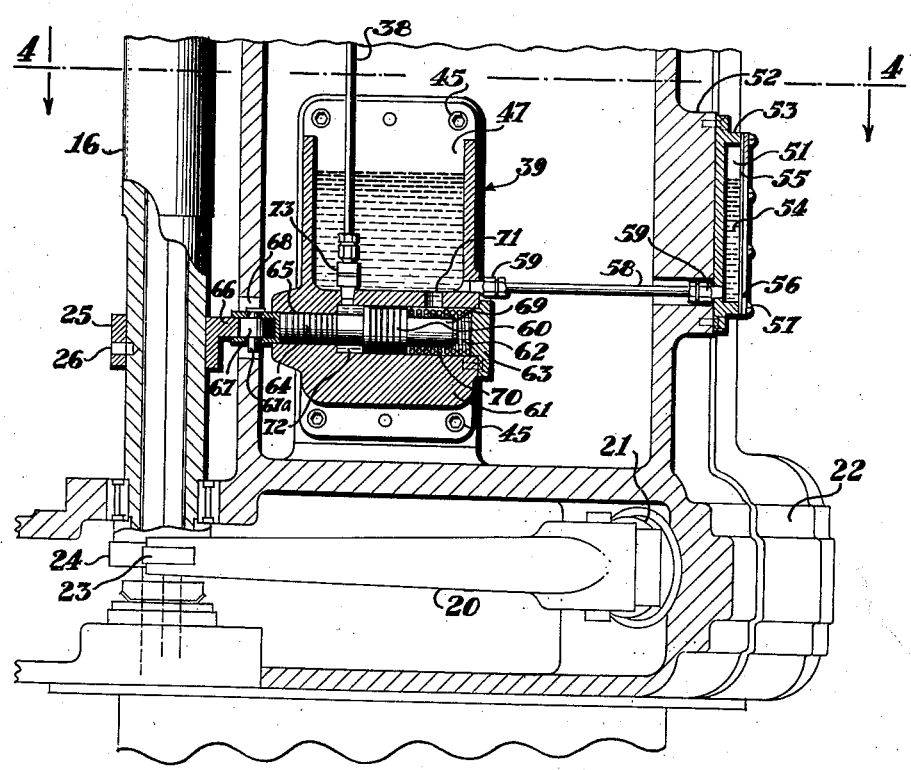
Figure 3 is a sectiona view taken on line 3—3 Figure 2, this view showing details of the pump and the pump actuating cam on the arm elevating and clamp control rod.

The structure of the arm clamp and elevating mechanism is well understood and only so much as is necessary for an understanding of the present improvement is illustrated herein. The cam 25 which actuates the pump piston is pinned to the tubular shaft 16 by means of a pin 26 (Figure 3). The position and shape of this cam brings about the lubricant delivery action in accordance with the objectives of the invention as will be described in detail hereinafter.

Referring specifically to Figure 2, it will be noted that rings 27 and 28, upper and lower respectively, are located so as to extend circumferentially around the column. These rings include annular recesses 29 for containing the lubricant. They are assembled over the column and embrace it throughout its circumference. The rings are bored transversely so as to receive bolts 32 which pass into threaded bores in the arm whereby the rings are secured to the respective ends of the sleeve portion of the arm.

Obviously, if the rings were mounted rigidly upon the sleeve portion of the arm they would interfere with the contraction or expansion of the arm as occurs when clamping and unclamping is accomplished. For this reason the bolts 32 are fixed in position in the upper and lower ends of the sleeve respectively and constitute studs projecting from these ends. The bores in the rings through which these studs pass are large enough to provide clearances 32a permitting the sleeve to contract and expand relative to the rings which fit the column snugly at all times. Further, in order to permit this relative movement, the nuts 33 screwed on the ends of the studs against the ring assemblies are adjusted so as not to clamp the rings too tightly permitting shifting of the studs laterally in the bores relative to the rings. These nuts are fixed in adjusted position by means of set screws. At the outer end of each ring cover plates 34 are provided. These cover plates are split and are fixed to the rings by means of screws 34a.

Intermediate of the outer edges of the rings 27 and 28 and the respective annular recesses 29, there are provided annular grooves 35 which contain circumferential gaskets or packings 36, these packings being in snug contact with the column. The gaskets or packings are held in place by means of the split retainer plates 34 and consist of backing rings 36a formed of brass, these rings being split and encircling the gasket means which in this case consists of rings of synthetic material treated to make them impervious to oil. A series of coil springs disposed in radial bores in the rings adjacent the grooves 35 hold the packing tightly against the column. These springs and their arrangement are disclosed in the previously filed application above mentioned and it is not believed necessary to describe their details in this instance. They are generally shown in Figure 4.

It is the purpose of the gaskets 36 to prevent, as much as possible, escape of oil from above and below the sleeve of the arm. Thus when oil is introduced into the recess 29 under the pressure of the pump, as will be described at a later point in the specification, the gaskets tend to prevent its escape. They also function to exclude grit and dirt from the bearing surface of the sleeve.

The lower annular groove 29 serves as an oil collector groove and since it is provided merely by counterboring the upper end of the lower ring 28, it tends to collect oil which would otherwise seep through the joint between the ring and the end of the sleeve. This is desirable inasmuch as oil tends to flow toward the lower portion of the sleeve and some clearance is necessary at the joint to provide for movability of the sleeve independent of the ring as previously described. The upper ring 27 is provided with an inlet port 37 to which is attached the upper end of a conduit 38 extending to the pump generally indicated at 39. A bleeder hole 40 may be provided in the upper ring at a point remote from the inlet port so as to vent air from the recess which, if trapped, would prevent satisfactory introduction of the lubricant.

The pump unit generally indicated at 39 is mounted upon the sleeve of the arm within a casing portion thereof generally indicated at 41. This casing portion is covered by means of a cover plate 42. The sleeve portion within the casing 41 includes an integral pad 43 which is machined to provide a flat attaching surface. The body 44 of the pump is secured to this pad or boss by means of screws 45 projecting through attaching flanges 46 of the body into screw threaded bores in the pad. The reservoir chamber 47 of the pump is open at the top and is refilled by way of a filler pipe 48 secured in the upper wall 49 of the casing portion and having its lower end terminating just above the reservoir (Figure 2). A displaceable filler cap 50 is provided at the top of the tube 48 outside of the casing.

The level of lubricant in the reservoir is indicated by means of a level indicating gauge 51 (Figures 3 and 5) mounted on an external boss 52 externally disposed on the casing wall. This gauge includes the usual body element 53 having an elongated vertical chamber 54 therein. A glass panel 55 is secured over the vertical chamber by means of a frame member 56. The frame is held in place by means of screws 57. A pipe 58 disposed horizontally connects the lower end of the chamber 54 and the lower portion of the reservoir. This pipe is secured in position by means of coupling members 59.

The pump includes a piston 60 which is disposed horizontally therein in a boss 61 at one side of the base of the reservoir. This piston includes axial extensions. The piston operates in a cylinder or pumping chamber 62, one end of which is closed by means of a cap 63 fixed by means of screws over the open end of the bore. The inner end of the pumping chamber terminates within the lug 61.

The axial extension 64 of the piston projects externally of the pump body being mounted in a bore 65. Its outer end is bifurcated, the bifurcation straddling the cam portion 66 of the cam 25 (Figures 3 and 4). A roller 67 is mounted between the bifurcations on a pin 67a traversing the bifurcations. The roller rides on the cam surface and therefore rotation of the cam causes translation of the piston. The clearance aperture 68 is provided in the casing wall for cleaning the cam and actuating extension of the piston.

The other end of the piston carries an axial extension 69 which constitutes a guide or a receiver for a coiled spring 70. The coiled spring encircling this extension is disposed under compression between the end of the piston and the inner face of the cap 63. Aperture 71 in the top of the lug allows the flow of lubricant into the spring chamber lubricating the same and preventing formation of a vacuum. The coiled spring in this case is the pump driving medium constantly urging the piston toward the cam and when the contour of the cam permits, causing an ejecting stroke of the piston forcing the lubricant out of the chamber 72 in front of the piston upwardly through the delivery pipe 38 to the upper ring 27. The conduit 38 is connected to this chamber 72 by means of couplings and fittings generally indicated at 73.

The lubricant is sucked into the pumping chamber 72 from the bottom of the reservoir; that is, the portion alongside the lug 61. For this purpose the lug is bored as follows: a bore 74 extends vertically upwardly from the bottom of the pump body and is closed by means of a plug 75. This bore is connected at its upper end to the chamber 72 by means of a cross bore 76 (Figure 7), also closing its outer end by means of a plug 77, the bore 76 traversing or intersecting the bore 74. The lubricant enters the bore 74 by way of another cross bore 78 bored entirely through the lug into the bottom of the reservoir. The outer end of this bore is also closed by means of a plug 79. This bore likewise intersects the bore 74 at the bottom thereof at right angles to the bore 76.

Control of the intake of lubricant is accomplished by means of a valve 80, a ball valve in this case, supported in a valve element 81. The bore 74 is counterbored to provide a shoulder and the valve element is screwed upwardly to cause its flange 82 to engage the shoulder. The ball valve rests upon an internal shoulder in the valve element and unseats upwardly due to the suction action in the pumping chamber as the cam forces the pumping piston back to starting or inactive position.

As will be evident from Figure 7, the suction action in the chamber 72 will seat a ball valve 83 contained within the fitting 84 attaching the delevry line 38 to the lug 61 of the pump. The valve arrangement for producing a filling or suction stroke is conventional and it is believed that the foregoing description will make its operation clear.

The cam 25 which is fixed to the clamping and elevating control shaft 16 includes three areas. As illustrated the cam is holding the piston in inactive position against the thrust of the spring. This is a neutral position and one in which the arm is clamped and the elevating bearing is at neutral. This area of the cam is indicated at 85.

If it is desired to raise the arm the shaft 16 is rotated anti-clockwise as viewed in Figure 4 with the result that the receding or low portion 86 of the cam will swing into position adjacent the roller of the piston. This permits the pump to inject a measured quantity of lubricant into the upper ring, the spring being active for forcing the piston toward the pumping chamber to clear it of oil. The cam portion 86 assumes this position when the control lever for the shaft 16 is moved to arm elevating and unclamping position.

If the shaft is swung clockwise the cam portion 87, which is on the same circle as the portion 85, will continue to hold the piston in inactive position and this occurs when the control lever is swung to arm lowering and unclamping position.

Thus it will be apparent that a measured quantity of lubricant or a shot is delivered to the upper ring directly upon movement of the control lever to arm elevating position. Therefore, lubricant is fed at the proper time and as the arm moves upwardly the lubricant thus delivered into the grove 29 will smear or coat the column as the arm moves upwardly. It is unnecessary to feed oil to the lower ring since the oil has a natural tendency to gravitate toward this ring and the lower ring thus becomes no more than a collector or retainer for holding the oil within the area of the bearing surface of the arm sleeve.

Having described my invention, I claim:

1. In a radial drill, the combination with the column and a contractable sleeve translatably embracing said column, of an annular ring providing an oil groove surrounding the column adjacent one end of the contractable sleeve, a second ring surrounding the column at the other end of the contractable sleeve, said last named ring including an oil retaining groove, both of said rings including packings whereby the oil on the column between the packings is maintained in suitable amounts for lubrication of the mating surfaces of the column and sleeve, pump means for delivering lubricant to the groove of the first named ring, means for controlling raising and lowering of the arm, and pump operating means between said control means and the pump effective for causing delivery of a measured quantity of lubricant in a single shot as the control means is moved to arm elevating position.

2. In a radial drill, the combination with a column, an arm mounted on the column including a contractable sleeve portion, and control means including a shaft for controlling the raising and lowering of the arm; of a pump including a piston, a cam on the control shaft, said cam including three effective areas, two of which are for the neutral and lowering portion of said control shaft and the third permitting an ejecting stroke of the piston when the control shaft is moved to arm elevating position, spring means for urging the piston for the delivery stroke, and valve means within the pump for refilling the pumping chamber when the piston is returned to position prior to ejection of lubricant.

3. In a radial drill, the combination with a column and an arm having contractable sleeve translatably embracing the column; an oiling ring surrounding the column adjacent to and above the contractable sleeve, a piston pump unit for supplying lubricant to said ring, a control shaft for controlling the clamping of said contractable sleeve to the column and for controlling the raising and lowering movements thereof, a piston in said pump unit, a cam on said control shaft engaging an end of said piston to actuate the same, and a spring disposed against the opposite end of said piston to urge the same toward said cam, said cam arranged to retract said piston against said spring when the control shaft is moved to arm lowering position and to cause the spring to urge the piston in oil delivery direction when said control shaft is moved to arm elevating position to provide a continuous supply of lubricant to said oiling ring during the upward movement of the sleeve relative to the column.

4. In a radial drill including a column and an arm having a sleeve embracing the column adapted to be raised and lowered relative to the column, a lubricating apparatus for supplying lubricant to the sleeve during the raising of the arm comprising; a lubricant reservoir mounted on the arm and having a cylinder formed in the lower portion thereof, the lower portion of the reservoir having a lubricant intake passageway including a check valve extending from the reservoir to the cylinder, a lubricant delivery conduit connected to the cylinder within the reservoir and extending upwardly through the reservoir to the upper end of the sleeve, a delivery piston slidable in said cylinder having an actuating plunger extending outwardly from the cylinder, a spring disposed in compression against the end of the piston adapted to urge the said piston in its lubricant delivery direction, a rock shaft arranged to control the raising and lowering movements of the arm, a cam on the rock shaft adjacent the end of said plunger arranged to actuate the plunger and piston, the said cam having a contour face which recedes from the end of the plunger when the rock shaft and cam are turned in the direction to raise the arm to cause the piston to move outwardly under the influence of said spring and force lubricant through the lubricant delivery conduit to the leading end of the sleeve during the raising movement of the arm, the said cam having a second face contour which is concentric to the axis of the rock shaft and arranged to maintain the plunger and piston in depressed position when the rock shaft is turned to arm lowering position.

5. A lubricating system for a radial drill including a column and an arm having a sleeve embracing said column and adapted to be raised and lowered relative to the column comprising, an oil sealing ring mounted respectively upon the upper and lower ends of the contractable sleeve in sealing engagement with the column and arranged to maintain an oil supply between the bearing surfaces of the sleeve and column, a rock shaft for controlling the raising and lowering of the arm, a pump unit mounted adjacent said rock shaft, an oil supply conduit extended from the pump unit to the upper end of the sleeve, a plunger slidably mounted in said oil pump and disposed substantially at right angles to the rock shaft, a cam on said rock shaft engaging an end of said plunger, a compression spring disposed against the opposite end of said plunger to urge the same in discharging direction toward said cam, the said rock shaft having a neutral position and being arranged to cause raising or lowering of the arm when the rock shaft is turned in respective opposite directions from the neutral position, the said cam having a concentric face contour coinciding with the neutral and lowering positions of the rock shaft and adapted to maintain the plunger in depressed position when the rock shaft is in neutral or in arm lowering position and having a second face contour which recedes from the end of the plunger when the rock shaft and cam is turned to arm raising position, whereby the plunger is actuated by the said compression spring to force oil through the oil supply conduit to the leading end of the sleeve during the raising of the arm.

WILLIAM G. HOELSCHER.

REFERENCES CITED

The following references are of record in the file of this patent:

UNITED STATES PATENTS

| Number | Name | Date |
|---|---|---|
| 880,680 | Matthews | Mar. 3, 1908 |
| 1,000,791 | Erickson | Aug. 15, 1911 |
| 2,079,700 | Archea | May 11, 1937 |
| 2,164,518 | Hart | July 4, 1939 |
| 2,209,938 | Schauer | July 30, 1940 |
| 2,425,281 | Hoelscher | Aug. 5, 1947 |